INVENTOR.
JOHN S. MALECKI

United States Patent Office 3,564,748
Patented Feb. 23, 1971

3,564,748
FISH LURE
John S. Malecki, 22329 Carolina,
St. Clair Shores, Mich. 48080
Filed Jan. 21, 1969, Ser. No. 800,327
Int. Cl. A01k 85/00
U.S. Cl. 43—42.51                         1 Claim

ABSTRACT OF THE DISCLOSURE

The disclosure is an improved fish lure having a helically twisted elongate body carrying a plurality of angularly displaced shanks and hooks thereon. The lure is formed out of sheet metal, the helical body providing for rotation of the lure as the latter is drawn through water and also to dispose the hooks angularly spaced apart through 360 degrees.

SUMMARY OF THE INVENTION

The invention resides in the construction of the fish lure and method of making the same from sheet material.

The principal object of the invention is to provide an improved fish lure for effectiveness and at a considable reduction in cost of such devices.

IN THE DRAWINGS

Figure 1:
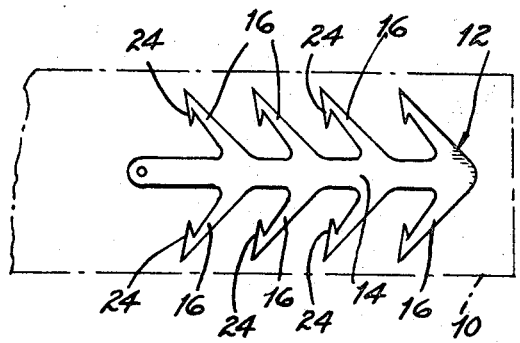
FIG. 1 is a plan view of a sheet metal blank illustrating the first step of the method of making my fish lure.
Figure 2:
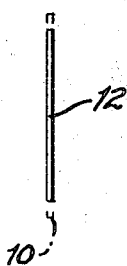
FIG. 2 is an end view of the blank.
Figure 3:
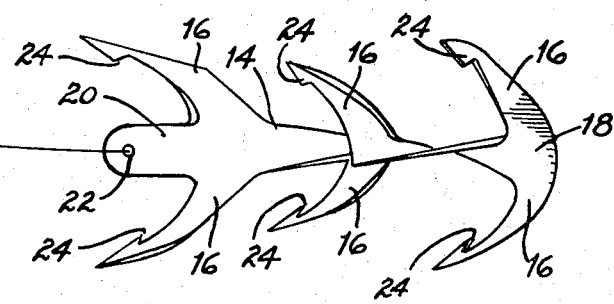
FIG. 3 is a side view of the completed fish lure.

Referring to the drawing by characters of reference, the fish lure is stamped out of a blank sheet of material 10, such as thin sheet steel, the blanked lure being designated, in general, by the numeral 12. As shown, the blank 12 comprises an elongate body or strip 14 having pairs of oppositely-disposed shanks or arms 16 extending from the opposite side edges of the strip 14. As shown in FIG. 1, the blank 12 is sheared forming a trailing end portion 18, the other or leading end of the blank being formed with a shank 20 apertured, as at 22, for attachment thereto of a fish line.

Figure 4:
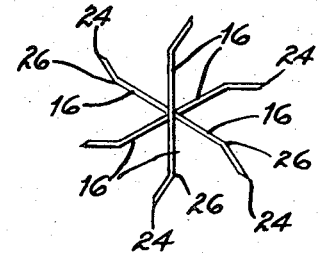
FIG. 4 is an end view of the fish lure as seen looking from right to left in FIG. 3.

As illustrated in FIG. 1, the shanks 16 are angularly inclined to the body 14, the shanks 16 extending outwardly and forwardly. On the end of each of the shanks 16 is formed a hook 24. In order to rigidify the sheet metal shanks, the shanks are each bent, as at 26, as shown in FIG. 4. Further, the body or strip 14 of the lure is provided with a 360 degree twist. This is accomplished by holding both ends 18 and 20 of the strip 14 and rotating one or both of them until they are equally displaced relative to each other. This step in the making of the lure disposes the hook shanks in substantially equally angular positions as shown in FIG. 4. Also, the twisting operation forms the body into a helical configuration to induce rotation of the lure as it is drawn through the water thus simulating a fish.

Figure 5:
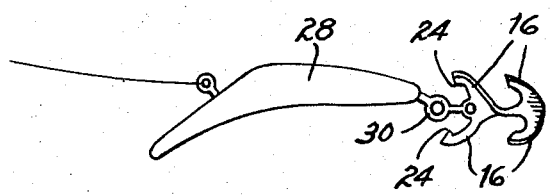
FIG. 5 is a modification showing my fish lure connected to a conventional plug.

In FIG. 5 there is shown a conventional type of fishing plug 28 having a spinner 30 to which my lure may be connected. As illustrated, the lure may be made having one or more pairs of hooks, as may be desired.

I claim:

1. A fish lure comprising an elongate sheet metal member constituting the body of the lure and having front and rear ends, a plurality of pairs of shanks spaced apart along the length of said body and extending laterally and forwardly thereof, the shanks of each pair being joined respectively to opposite edges of said body and rigid therewith, a hook formed rigidly on the end of each of said shanks, the shanks of each of said pair being coplanar, the hooks on each pair of shanks being angularly bent to opposite sides of the plane of said shanks, and twists in said body intermediate adjacent shanks positioning said pairs of shanks in equally angularly spaced relationship relative to the longitudinal axis of said elongate body.

References Cited

UNITED STATES PATENTS

| | | | |
|---|---|---|---|
| 2,123,150 | 7/1938 | Larson et al. | 43—42.51 |
| 2,184,073 | 12/1939 | Fuiks | 43—42.7 |
| 2,490,583 | 12/1949 | Dunkelberger | 43—44.82 |

SAMUEL KOREN, Primary Examiner

D. J. LEACH, Assistant Examiner

U.S. Cl. X.R.
43—42.52, 44.82